United States Patent
Dmytriw et al.

(10) Patent No.: US 8,010,322 B2
(45) Date of Patent: *Aug. 30, 2011

(54) SIGNAL CONDITIONING IC WITH CONDITIONING-COEFFICIENT MEMORY

(75) Inventors: Anthony M. Dmytriw, Dublin, OH (US); Lamar F. Ricks, Lewis Center, OH (US)

(73) Assignee: Honeywell International Inc., Morristown, NJ (US)

( * ) Notice: Subject to any disclaimer, the term of this patent is extended or adjusted under 35 U.S.C. 154(b) by 472 days.

This patent is subject to a terminal disclaimer.

(21) Appl. No.: 11/383,828

(22) Filed: May 17, 2006

(65) Prior Publication Data

US 2007/0271069 A1    Nov. 22, 2007

(51) Int. Cl.
*H03F 1/26* (2006.01)
*H04B 15/00* (2006.01)
*G01C 25/00* (2006.01)
*G01D 18/00* (2006.01)
*G01F 25/00* (2006.01)

(52) U.S. Cl. ........................................ 702/189; 702/104

(58) Field of Classification Search ................ 702/104, 702/107, 189, 57, 58, 116, 183, 185; 324/601, 324/602, 609
See application file for complete search history.

(56) References Cited

U.S. PATENT DOCUMENTS

| | | | |
|---|---|---|---|
| 4,090,215 A * | 5/1978 | Buchan et al. | 386/19 |
| 4,303,984 A | 12/1981 | Houvig | |
| 4,494,183 A | 1/1985 | Bayer et al. | |
| 4,845,649 A * | 7/1989 | Eckardt et al. | 702/104 |
| 5,012,667 A | 5/1991 | Kruse | |
| 5,038,305 A | 8/1991 | Kumar et al. | |
| 5,089,979 A | 2/1992 | McEachern et al. | |
| 5,251,157 A | 10/1993 | Prather | |
| 5,321,638 A | 6/1994 | Witney | |
| 5,329,818 A | 7/1994 | Frick et al. | |
| 5,365,768 A | 11/1994 | Suzuki et al. | |
| 5,479,096 A | 12/1995 | Szczyrbak et al. | |
| 6,032,109 A * | 2/2000 | Ritmiller, III | 702/104 |
| 6,035,721 A | 3/2000 | Krisch | |
| 6,053,031 A | 4/2000 | Kullik et al. | |
| 6,321,171 B1 | 11/2001 | Baker | |
| 6,687,642 B2 | 2/2004 | Maher et al. | |

(Continued)

FOREIGN PATENT DOCUMENTS

DE    3446248    6/1986

(Continued)

OTHER PUBLICATIONS http://ieee1451.nist.gov/tedssen.html, "TEDS," 2 pages, prior to May 17, 2006.

(Continued)

*Primary Examiner* — Michael P Nghiem
(74) *Attorney, Agent, or Firm* — Seager, Tufte & Wickhem LLC

(57) ABSTRACT

A signal conditioning integrated circuit includes both signal conditioning circuitry and memory devoted to storing end-user downloadable coefficients. In a preferred embodiment, the integrated circuit is an Application Specific Integrated Circuit (ASIC), and the end-user downloadable coefficients, based upon a mathematical equation pre-selected by the end-user, are pre-stored in the ASIC when a sensor device with which the ASIC is associated is calibrated. This results in a customized and more cost-effective and space-efficient signal-conditioning apparatus with improved functionality over that available in the prior art.

28 Claims, 2 Drawing Sheets

U.S. PATENT DOCUMENTS

| | | | |
|---|---|---|---|
| 6,701,274 B1 * | 3/2004 | Eryurek et al. | 702/140 |
| 6,823,711 B1 | 11/2004 | Chen et al. | |
| 7,016,792 B2 | 3/2006 | Schneider | |
| 7,061,325 B2 | 6/2006 | Pitz | |
| 7,398,173 B2 * | 7/2008 | Laraia et al. | 702/99 |
| 7,520,184 B2 | 4/2009 | Uemura et al. | |
| 7,634,437 B1 | 12/2009 | Tanpoco | |
| 7,769,557 B2 * | 8/2010 | Bey et al. | 702/100 |
| 2002/0103613 A1 | 8/2002 | Maher et al. | |
| 2003/0171882 A1 * | 9/2003 | Thielman et al. | 702/64 |
| 2004/0070394 A1 * | 4/2004 | Gonzalez Ballester et al. | 324/307 |
| 2006/0089813 A1 * | 4/2006 | Mushirahad et al. | 702/39 |
| 2006/0265167 A1 * | 11/2006 | Laraia et al. | 702/99 |
| 2007/0271070 A1 * | 11/2007 | Dmytriw et al. | 702/188 |
| 2008/0270062 A1 * | 10/2008 | Laraia et al. | 702/104 |
| 2010/0004889 A1 * | 1/2010 | Bey et al. | 702/100 |
| 2010/0268485 A1 * | 10/2010 | Bey et al. | 702/45 |

FOREIGN PATENT DOCUMENTS

| | | |
|---|---|---|
| DE | 3803104 A1 | 8/1989 |
| EP | 0892249 | 1/1999 |
| GB | 2065890 | 7/1981 |
| WO | 9412940 | 6/1994 |
| WO | 0034744 | 6/2000 |

OTHER PUBLICATIONS http://ieee1451.nist.gov/metateds.html, "Below is an Example of a Meta TEDS," 2 pages, prior to May 17, 2006.

http://ieee1451.nist.gov/chanteds.html, "Below is an Example of a Channel TEDS," 1 page, prior to May 17, 2006.

http://ieee1451.nist.gov/calibteds.html, "Below is an Example of a Calibration TEDS," 1 page, prior to May 17, 2006.

http://ieee1451.nist.gov/correc.html, "Correction (by Use of Data in a Calibration TEDS)," 1 page, prior to May 17, 2006.

http://web.archive.org/web/20060317003924, "Sensors (Including IEEE-P1451.4 Plug-and-Play Sensors) Overview," Maxim Integrated Products, 2 pages, copyright 2006.

http://web.archive.org/web/20060322155856, "Pressure Sensors," Maxim, 4 pages, prior to May 17, 2006.

http://web.archive.org/web/20050906233240, "MAX 1457," Maxim, 3 pages, prior to May 17, 2006.

http://web.archive.org/web/20050906123256, "MAX 1452 Low-Cost, Precision Sensor Signal Conditioner," Maxim, 3 pages, prior to May 17, 2006.

http://web.archive.org/web/20050831115252, "MAX 1455 Low-Cost Automotive Sensor Signal Conditioner," Maxim, 3 pages, prior to May 17, 2006.

http://web.archive.org/web/20050407175641, "MAX 1463 Low-Power, Two Channel Sensor Signal Processor," Maxim 2 pages, prior to May 17, 2006.

http://web.archive.org/web/20060322155905, "Temperature Sensors," Maxim, 7 pages, prior to May 17, 2006.

Maxim, "MAX 1464 Low-Power, Low-Noise Multichannel Sensor Signal Processor," 47 pages, revised Feb. 2005.

Maxim, "MAX 1463 Low-Power, Two-Channel Signal Processor," 50 Pages, Nov. 2004.

http://web.archive.org/web/20060322160322160032, "Sample and Infinite Hold (for Calibration)," 2 pages, Copyright 2006.

http://web.archive.org/web/20060322174055, "DS4305 Sample-and-Infinite-Hold Voltage Reference," Maxim, 3 pages prior to May 17, 2006.

http://web.archive.org/web/20060114014946, "DS4303, DS4303K, Voltage Sample and Infinite Hold," 3 pages prior to May 17, 2006.

* cited by examiner

SIGNAL CONDITIONING IC WITH CONDITIONING-COEFFICIENT MEMORY

FIELD OF THE INVENTION

This invention relates to the conditioning of signals sensed by sensor transducers.

BACKGROUND OF THE INVENTION

A transducer is a device that converts one type of energy into another type of energy for the purpose of measurement or information transfer. A sensor transducer is a type of transducer that detects (senses) a signal or physical condition and converts it to a signal that can be read and analyzed by humans. Examples of devices that use sensor transducers include mass airflow sensors, speed sensors, position sensors, pressure sensors, relative humidity sensors, and the like.

As is well known, the output of a sensor transducer, referred to herein as a "raw signal", must be conditioned so that it can be properly used by an end-user. Signal conditioning circuits and conditioning techniques (also referred to as "signal compensation" or "signal correction") condition raw signals from sensor transducers, regardless of the quantity being measured by the sensor transducer or the sensor transducer technologies.

Some sensor transducers have very linear and stable outputs and require minimal conditioning; other sensor transducer technologies produce extremely non-linear signals and require a significant amount of conditioning to meet required linear outputs. Ambient temperature and the sensitivities of the various sensing technologies can also affect the linearity and stability of the signal output from a sensor transducer, further adding to the need to condition the output signal.

Application Specific Integrated Circuits (ASICs) have been developed for conditioning sensor transducer signals, and these ASICs offer a wide variety of programming options that can be specifically tailored to match the characteristics of the particular sensor technology. Because there are so many different types of sensors on the market (pressure, airflow, speed, position, etc.), it is practically impossible to design an affordable ASIC capable of conditioning the raw signals output from every type of transducer. However, in most cases raw signals need to be conditioned for similar characteristics (sensitivity, offset, temperature induced sensitivity changes, temperature induced offset changes and non-linear characteristics) and thus generic conditioning circuits with the ability to "coarsely" condition raw signals for these basic characteristics have been developed. Coarse conditioning as used herein refers to conditioning of a signal using lower order polynomial expressions, e.g., $2^{nd}$ order polynomial expressions or lower. Typical conditions for which coarse conditioning would be appropriate include compensating a signal for sensitivity changes due to temperature or signal offset changes due to temperature.

Currently, sensor manufacturers are using two methods to condition a raw signal output from a sensor transducer and deliver it to the user, each of which is advantageous in its own way. In a first method, a signal conditioning ASIC includes a conditioning circuit capable of coarsely conditioning the raw signal and delivers this coarsely-conditioned signal to the end-user. Since the basic level of conditioning is provided by the ASIC, the end-user need not provide or use its own processors to perform conditioning, thereby freeing them up for other tasks. A drawback, as described above, is that the robustness of the conditioning is limited in favor of having a signal conditioning chip that can be used in a wide variety of applications.

A second method is to provide the end-user with downloadable compensation coefficients that are applied to conditioning equations processed by the processor(s) of the end-user device receiving a raw signal from a sensor. In practice, memory such as a TEDS (Transducer Electronic Data Sheet) IC stores downloadable coefficients that can be used in applications such as signal conditioning applications. A sensor transducer outputs a raw signal to the end-user device, and the optimal coefficients that have been downloaded from the memory are used by a processor in the end-user's system to apply to equations that perform the desired conditioning. Using downloadable coefficients from a memory location gives an end-user the flexibility to, when needed, use higher order (e.g., $3^{rd}$ order polynomial expressions or greater) exponential functions to condition the raw transducer signals, instead of having to use the more generic conditioning coefficients provided by the signal-conditioning ASIC described above. However, since the end-user performs the conditioning process on the raw signals coming directly from the sensor transducer, the end-user must tie up its processors for conditioning purposes.

It would be desirable to have an integrated circuit customized to the needs of a particular end-user and providing both a coarsely-conditioned signal to the end-user and the downloadable coefficients needed to provide higher level conditioning when needed.

SUMMARY OF THE INVENTION

In accordance with the present invention, a signal conditioning integrated circuit includes both signal conditioning circuitry and memory devoted to storing end-user downloadable coefficients. In a preferred embodiment, the integrated circuit is an Application Specific Integrated Circuit (ASIC), and the end-user downloadable coefficients, based upon a mathematical equation pre-selected by the end-user, are pre-stored in the ASIC when the sensor device is calibrated. This results in a customized and more cost-effective and space-efficient signal-conditioning apparatus with improved functionality over that available in the prior art.

DETAILED DESCRIPTION OF THE INVENTION

Figure 1:
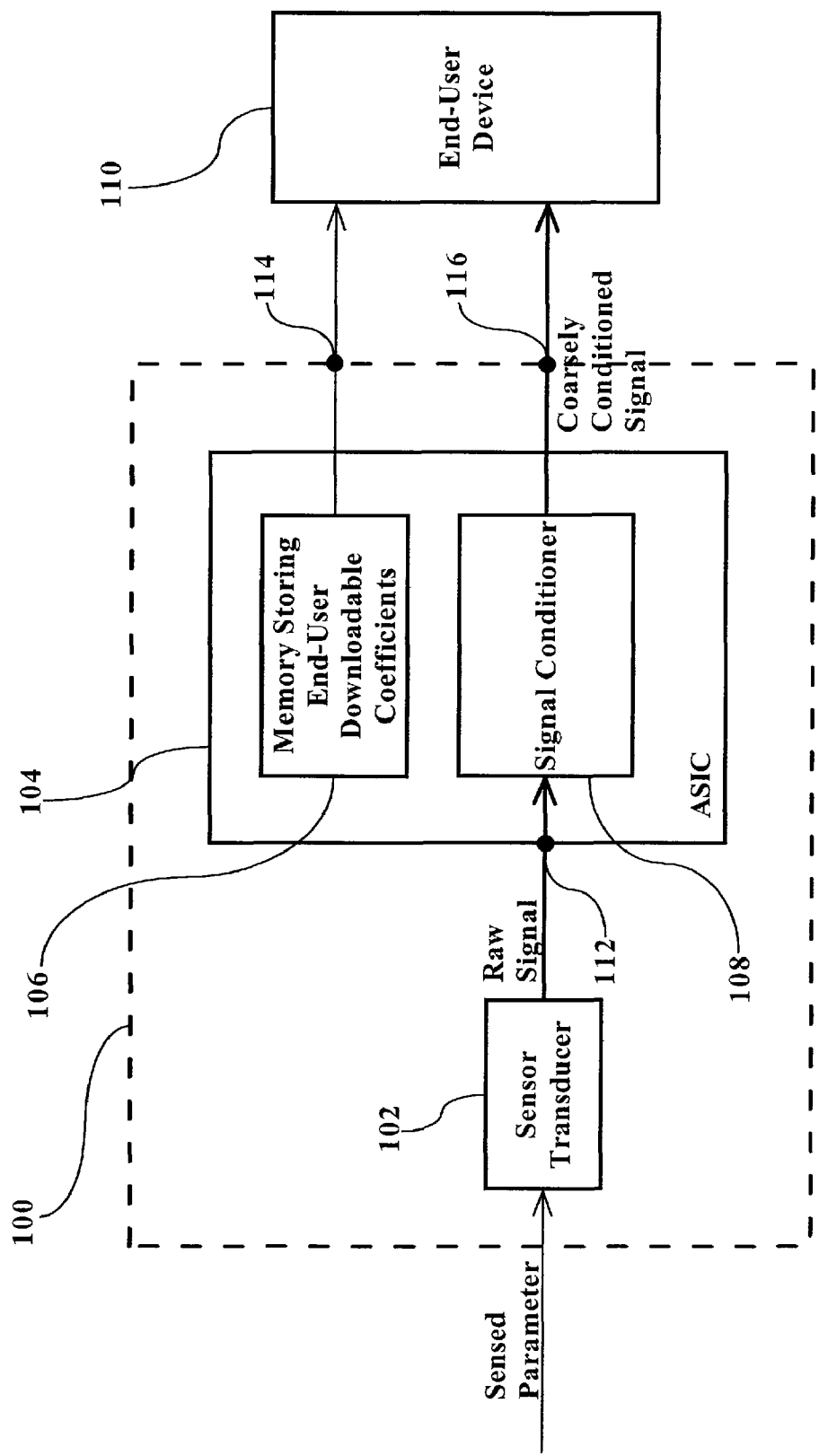
FIG. 1 is a block diagram illustrating the basic structure and concept of an apparatus according to the present invention.

FIG. 1 is a block diagram illustrating the basic structure and concept of a preferred embodiment of the present invention. Referring to FIG. 1, a sensor 100 includes a sensor transducer 102 outputting a raw signal to an input 112 of a signal conditioner 108 of an ASIC 104. Sensor 100 can be any kind of sensor, for example, a mass airflow sensor, a speed sensor, a position sensor, a pressure sensor, a relative humidity sensor, etc. The raw signal corresponds to a parameter sensed by sensor transducer 102. Signal conditioner 108 conditions the raw signal from sensor transducer 102 in a well-known manner, using lower-order polynomial expressions (e.g., $2^{nd}$ order or lower) to produce a coarsely-conditioned signal which is output, in this example, to end-user device 110 via an output 116.

End-user device 110 can comprise, for example, a microprocessor used by the end-user to analyze, store, and otherwise use the data coming from sensor 102. The microprocessor may be dedicated for that purpose; more typically the microprocessor will be part of a larger processing device that uses the analyzed data for some other purpose, e.g., an airflow monitor used for monitoring the breathing of a hospital patient.

ASIC 104 is situated between sensor transducer 102 and end-user device 110. ASIC 104 is equipped with memory 106. This memory 106 stores specific coefficients downloadable to the end-user device 110 by the end-user via an output 114 to perform particular tasks. For example, the end-user may have use for the coarsely conditioned signal from signal conditioner 108 for a certain application, but also have a need for a more linearized signal resulting from the further conditioning of the coarsely conditioned signal using a predetermined equation and certain sensor-specific sinusoidal Fourier coefficients. In accordance with the present invention, when the sensor 100 is provided to the end-user, memory 106 has these Fourier coefficients specific to needs of that particular end-user stored and available for the end-user to download.

Thus, the end-user can take sensor 100, connect it to their end-user device 110, and download the downloadable coefficients from memory 106, before receiving sensed signals from sensor 100. This configures the end-user device 110 to both receive the coarsely compensated signals from signal conditioner 108, and gives them the ability to apply the predetermined equations downloaded from memory 106 to the coarsely compensated signal and compensate it even further to achieve a more accurate, highly compensated signal. This second level of compensation, performed using the downloadable coefficients, is referred to herein as "fine conditioning" and means conditioning the signal using polynomial expressions of an order higher than those used for coarse conditioning, e.g., $3^{rd}$ order polynomial expressions or greater.

In the drawing of FIG. 1, the sensor transducer 102 and ASIC 104 are illustrated as being integrated into sensor 100; however, it is understood that sensor 102 and ASIC 104 can be separate (non-integrated) components and such a non-integrated configuration falls within the scope of the invention claimed herein. Further, in the preferred embodiment the memory 106 and signal conditioner 108 are configured in an ASIC; however, it is understood that the memory 106 and signal conditioner 108 can also be configured in a general purpose integrated circuit and such a configuration falls within the scope of the invention claimed herein.

Although memory 106 could be loaded with a set of generic coefficients that could be usable by any end-user, in the preferred embodiment, memory 106 is preconfigured, prior to delivery for use by the end-user, with only the specific coefficients needed for application to the conditioning equation (s) being used by the end-user. In a preferred embodiment, the memory comprises an Electrically Erasable Programmable Read Only Memory (EEPROM). The process of loading a memory with coefficients is a known process and is not described further herein. Further, while in the examples above the "lower order" polynomial expressions are described as being $2^{nd}$ order or lower and the higher level of conditioning is described as being performed using $3^{rd}$ order or higher polynomial expressions, these values are given for the purpose of example only. Of relevance to the present invention is that a first level of conditioning is performed by the signal conditioning circuitry on board the IC, and a second level of conditioning is performed by the end-user device using the downloadable coefficients stored in the memory of the IC.

Figure 2:
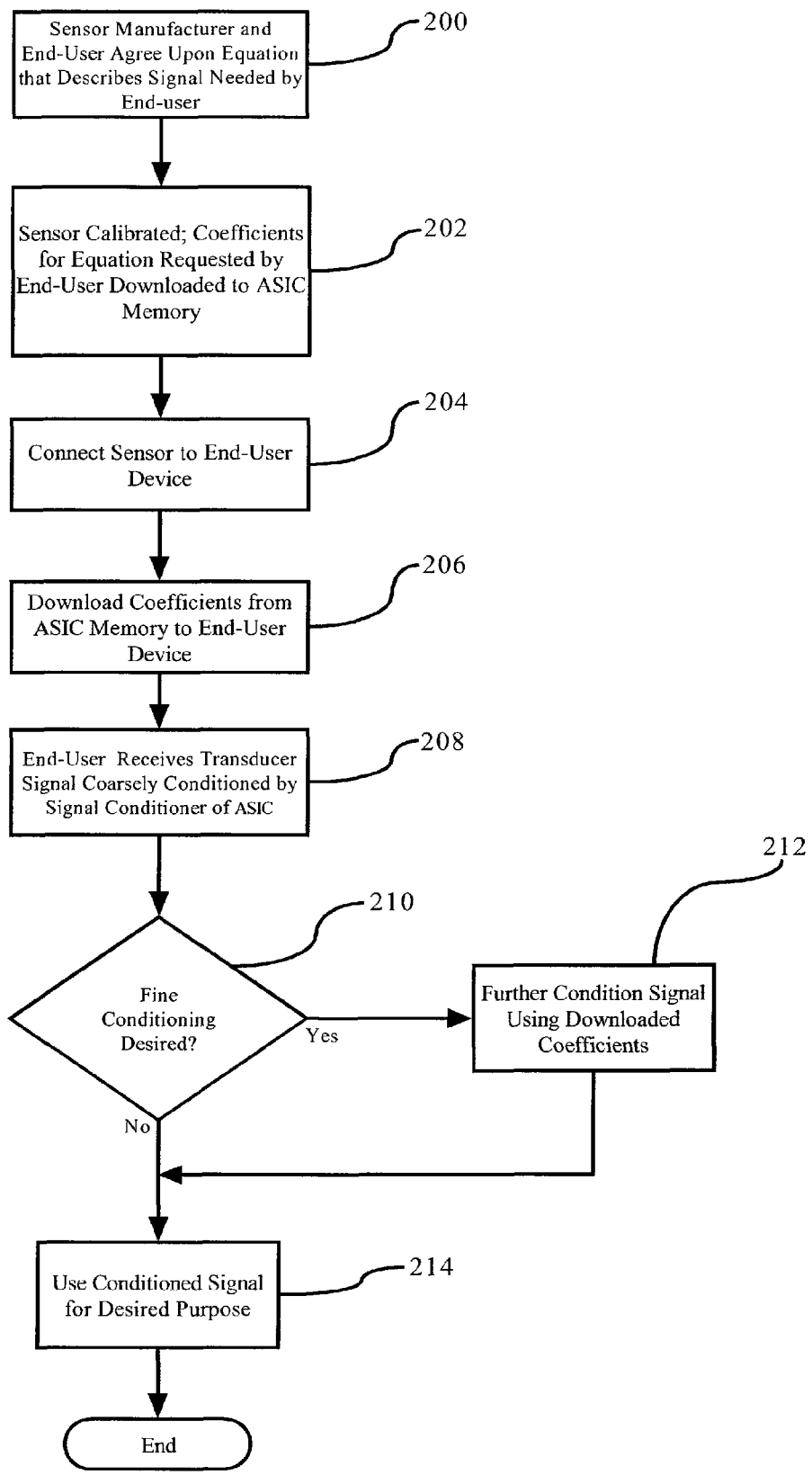
FIG. 2 is a flowchart illustrating steps performed in accordance with the present invention.

FIG. 2 is a flowchart illustrating steps performed in accordance with the present invention. At step 200, the sensor manufacturer/supplier and the end-user agree upon one or more conditioning equations that will be used to finely condition the coarsely-conditioned signal received from sensor 100. The equation will differ, for example, depending on the linearity or non-linearity of the raw signal output by the sensor.

At step 202, the sensor is calibrated, and coefficients for the equation(s) being used by the end-user are downloaded to the ASIC memory. Preferably, the coefficients for the equation(s) requested by the end-user are installed at the factory at the same time that the sensor is tested during calibration. Alternatively, the coefficients could be stored during a post-manufacture process prior to delivery to the end-user.

At step 204, the sensor 100 is connected to the end-user device. At step 206, upon connection to the end-user device, the coefficients from the ASIC memory are downloaded to the end-user device so that they are available for use. If desired, this step can be deferred until the coefficients are actually needed. At step 208, the end-user device receives coarsely-conditioned signals from signal conditioner 108 of sensor 100.

At step 210, a determination is made as to whether or not fine conditioning is desired. If fine conditioning is desired, the process proceeds to step 212, where further conditioning is performed on the signals using the downloaded coefficients and the appropriate equation, and then the process proceeds to step 214, where the fine-conditioned signal is used for its intended purpose. If at step 210 it is determined that fine conditioning is not desired, the process proceeds directly to step 214 and the coarsely-conditioned signal is used for its desired purpose.

By incorporating the ability to have downloadable coefficients pre-loaded into a sensor delivered to an end-user, the sensor manufacturer can deliver a highly accurate sensor that can still be used in numerous settings. This, in turn, keeps the overall sensor cost down which is a positive result for both the manufacturer and end-user.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage. In a client/server environment, such software programming code may be stored with storage associated with a server. The software programming code may be embodied on any of a variety of known media for use with a data processing system, such as a diskette, or hard drive, or CD ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

We claim:

1. An apparatus configured as an integrated circuit, comprising:
    signal-conditioning circuitry configured to perform a coarse-correction on a signal input thereto and to output a coarsely-conditioned signal therefrom, wherein the coarse-correction on the signal compensates the signal for one or more error(s);
    a storage location storing predetermined coefficients for use in performing a fine-correction on the coarsely-conditioned signal that is output from said signal-conditioning circuitry;
    a coarsely-conditioned-signal output coupled to said signal-conditioning circuitry and coupleable to an end-user device;
    a coefficient output coupled to said storage location and coupleable to the end-user device; and
    wherein when said coarsely-conditioned signal output and said coefficient output are coupled to the end-user device, said end-user device receives the coarsely-conditioned signal from said signal-conditioning circuitry via said coarsely-conditioned signal output and receives said predetermined coefficients from said storage location via said coefficient output to perform the fine-correction.

2. The apparatus of claim 1, further comprising:
    a sensed-signal input coupled to said signal-conditioning circuitry and couplable to a sensor, wherein when said sensed-signal input is coupled to the sensor, said sensor-conditioning circuitry receives a sensor signal from the sensor and performs said coarse-correction on said sensor signal, thereby developing said coarsely-conditioned signal.

3. The apparatus of claim 2, wherein the end-user device is configured to perform the fine correction on said coarsely-conditioned signal using at least some of said predetermined coefficients.

4. The apparatus of claim 1, wherein said signal conditioning circuitry and said storage location are provided on an Application Specific Integrated Circuit (ASIC).

5. The apparatus of claim 4, wherein said storage location is part of an Electrically Erasable Programmable Read Only Memory (EEPROM).

6. The apparatus of claim 1, wherein the signal input to the signal-conditioning circuitry is a raw signal produced by a sensor.

7. The apparatus of claim 1, wherein the predetermined coefficients at least partially define a higher-order polynomial expression used to perform the fine correction on the coarsely-conditioned signal.

8. The apparatus of claim 7, wherein the coarse-correction includes applying a lower-order polynomial expression to the signal.

9. The apparatus of claim 8, wherein the lower-order polynomial expression is a $2^{nd}$ order polynomial or lower, and the higher-order polynomial expression is a $3^{rd}$ order polynomial or greater.

10. The apparatus of claim 1 wherein the one or more error(s) include a temperature induced offset.

11. The apparatus of claim 1 wherein the signal is input to the signal-conditioning circuitry from a sensor, and wherein the one or more error(s) include a temperature induced variation of the sensor.

12. The apparatus of claim 1 wherein the signal is input to the signal-conditioning circuitry from a sensor, and wherein the one or more error(s) include a non-linear characteristic of the sensor.

13. The apparatus of claim 1 wherein the signal is input to the signal-conditioning circuitry from a sensor, and wherein the one or more error(s) include an offset of the sensor.

14. A method of conditioning a sensor signal from a sensor, comprising:
    configuring an integrated circuit to perform a coarse correction on said sensor signal and to output a coarsely conditioned signal that corresponds to said sensor signal, the coarse correction compensating said sensor signal for a non-linear characteristic, an offset, a sensitivity, and/or a temperature induced variation;
    configuring said integrated circuit to store coefficients usable by an end-user device that is separate from said integrated circuit to perform a fine correction on said coarsely conditioned signal;
    configuring said integrated circuit to download said coefficients stored on said integrated circuit to the end-user device after the end-user device is coupled to said integrated circuit.

15. The method of claim 14, wherein said integrated circuit comprises an Application Specific Integrated Circuit (ASIC).

16. The method of claim 15, further comprising integrating said sensor and said Application Specific Integrated Circuit (ASIC) into a sensor device.

17. The method of claim 14, further comprising:
    coupling the end-user device to said integrated circuit;
    outputting said coarsely-conditioned signal to the end-user device;
    downloading said stored coefficients from the integrated circuit to the end-user device; and
    using the end-user device to perform said fine-correction on said coarsely-conditioned signal to thereby produce a finely-conditioned signal.

18. The apparatus of claim 14 wherein the sensor signal is a raw signal produced by the sensor.

19. The apparatus of claim 14, wherein the coarse correction includes applying a $2^{nd}$ order polynomial expression or lower to the sensor signal.

20. The apparatus of claim 19, wherein the fine correction includes applying a $3^{rd}$ order polynomial expression or greater to the coarsely conditioned signal.

21. A computer program product for conditioning a sensor signal from a sensor, the computer program product comprising a non-transitory computer-readable storage medium having computer-readable program code embodied in the medium, the computer-readable program code comprising:

computer-readable program code that configures an integrated circuit to perform a coarse correction on said sensor signal and to output a coarsely conditioned signal that corresponds to said sensor signal, the coarse correction on said sensor signal adjusts said sensor signal in a manner that compensates for a temperature related variation;

computer-readable program code that configures said integrated circuit to store coefficients usable by an end-user device to perform a fine correction on said coarsely conditioned signal;

computer-readable program code that configures said integrated circuit to download said stored coefficients to the end-user device after the end-user device is coupled to said integrated circuit.

22. The computer program product of claim 21, wherein said integrated circuit comprises an Application Specific Integrated Circuit (ASIC).

23. An apparatus configured as an integrated circuit, comprising:

signal-conditioning circuitry configured to perform a coarse-correction on a signal input thereto and to output a coarsely-conditioned signal therefrom, wherein the coarse-correction on the signal compensates the signal for one or more error(s), and wherein the coarse-correction includes applying a lower-order polynomial expression to the signal;

a storage location storing predetermined coefficients for use in performing a fine-correction on the coarsely-conditioned signal that is output from said signal-conditioning circuitry; and wherein when said signal conditioning circuitry is coupled to an end-user device, said integrated circuit is configured to provide the end-user device with the coarsely-conditioned signal from said signal-conditioning circuitry and said predetermined coefficients from said storage location to perform the fine-correction.

24. An apparatus configured as an integrated circuit, comprising:

signal-conditioning circuitry configured to perform a coarse-correction on a signal input thereto and to output a coarsely-conditioned signal therefrom, wherein the coarse correction includes applying a $2^{nd}$ order polynomial expression or lower to the signal;

a storage location storing predetermined coefficients for use in performing a fine-correction on the coarsely-conditioned signal output from said signal-conditioning circuitry, wherein the fine-correction includes applying a $3^{rd}$ order polynomial expression or greater to the coarsely-conditioned signal; and wherein when said signal conditioning circuitry is coupled to an end-user device, said integrated circuit is configured to provide the end-user device with the coarsely-conditioned signal from said signal-conditioning circuitry and said predetermined coefficients from said storage location to perform the fine-correction.

25. The apparatus of claim 24, further comprising:

a coarsely-conditioned-signal output coupled to said signal-conditioning circuitry and coupleable to the end-user device;

a coefficient output coupled to said storage location and coupleable to the end-user device;

wherein when said coarsely-conditioned signal output and said coefficient output are coupled to the end-user device, said end-user device receives the coarsely-conditioned signal from said signal-conditioning circuitry via said coarsely-conditioned signal output and receives said predetermined coefficients from said storage location via said coefficient output.

26. The apparatus of claim 25, further comprising:

a sensed-signal input coupled to said signal-conditioning circuitry and couplable to a sensor, wherein when said sensed-signal input is coupled to the sensor, said sensor-conditioning circuitry receives a sensor signal from the sensor and performs said coarse-correction on said sensor signal, thereby developing said coarsely-conditioned signal; and wherein the end-user device is configured to perform the fine correction on said coarsely-conditioned signal using at least some of said predetermined coefficients.

27. An apparatus configured as an integrated circuit, comprising:

signal-conditioning circuitry configured to perform a first correction on a signal input thereto and to output a first corrected signal therefrom, wherein the first correction compensates the signal for one or more first error(s);

a storage location for storing predetermined coefficients for use in performing a second correction on the first corrected signal that is output from said signal-conditioning circuitry;

a signal output coupled to said signal-conditioning circuitry and coupleable to an end-user device, wherein the signal output is configured to output the first corrected signal;

a coefficient output coupled to said storage location and coupleable to the end-user device; and wherein when said signal output and said coefficient output are coupled to the end-user device, said end-user device receives the first corrected signal from said signal-conditioning circuitry via said signal output and said end-user device receives said predetermined coefficients from said storage location via said coefficient output to perform said second correction.

28. The apparatus of claim 27, wherein the end-user device is configured to perform the second correction on said first corrected signal using at least some of said predetermined coefficients.

* * * * *